Dec. 28, 1926. Re. 16,509

L. V. BURKHOLDER

LACED BOX

Original Filed August 25, 1922

INVENTOR,
Lutie V. Burkholder;
BY
F. E. Maynard
ATTORNEY.

Reissued Dec. 28, 1926.

Re. 16,509

UNITED STATES PATENT OFFICE.

LUTIE V. BURKHOLDER, OF LOS ANGELES, CALIFORNIA.

LACED BOX.

Original No. 1,495,669, dated May 27, 1924, Serial No. 584,297, filed August 25, 1922. Application for reissue filed May 24, 1926. Serial No. 111,464.

My invention relates to boxes or receptacles particularly adapted, though not necessarily, for the reception and carrying of sewing paraphernalia by school girls.

It is a purpose of my invention to provide a receptacle of the above described character which is of extremely simple, durable and efficient construction, and which is formed so as to be capable of occupying a knock-down position to facilitate storage, shipment and the display of a plurality of such receptacles, and to occupy a set-up position to provide a container for sewing paraphernalia which may be conveniently carried especially by school girls.

Although I have herein shown and described only one form of work receptacle embodying my invention, it is to be understood that various changes and modifications may be made herein without departing from the spirit of the invention and the spirit and scope of the appended claims.

In the accompanying drawings.

Figure 4:
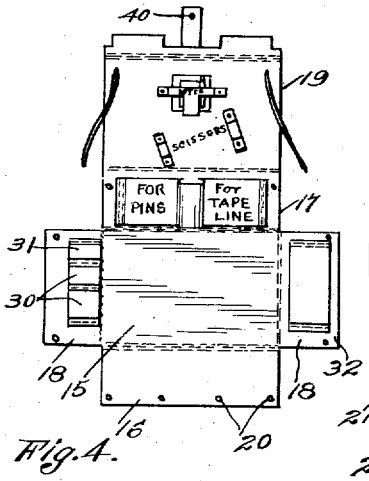
Fig. 4 is a plan view of the receptacle in knock-down position.

Referring specifically to the drawings in which similar reference characters refer to similar parts, my invention, in its present embodiment, comprises a bottom portion 15, a rear side portion 16, a front side portion 17, end portions 18 and a cover or top portion 19. All of these portions may be formed of any suitable material such as cardboard or the like covered with a fabric or other flexible material which is arranged associated with the cardboard to provide hinge connections between the several portions so as to allow the receptacle being folded from the position shown in Fig. 4 to that shown in Fig. 1.

Figure 3:
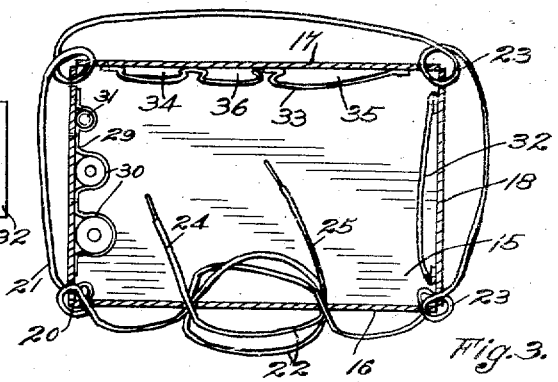
Figure 3 is a horizontal sectional view of the receptacle shown in the preceding views.

As clearly shown in Figs. 3 and 4, the portions 16 to 19 inclusive are formed with openings 20 through which is extended a lace, tape or the like designated at 21. As clearly shown in Fig. 3, the tape is extended through certain of the openings 20 of the front side portion 16 to provide a pair of loops 22 which constitute the handle for carrying the receptacle. From these loops one stretch of the lace is extended through the openings 20 at the corners of the receptacle to provide loops 23, and by means of these loops the portions constituting the receptacle are adapted to be held in vertical position to maintain the receptacle in set up position. The lace having been extended to provide the loops, the free end of the lace 24 is extended to the inner side of the receptacle and is adapted to be tied to the other end designated at 25 so as to maintain the lace in contiguous relation to the sides of the receptacle and to thereby firmly secure the receptacle in set up position.

Figure 1:
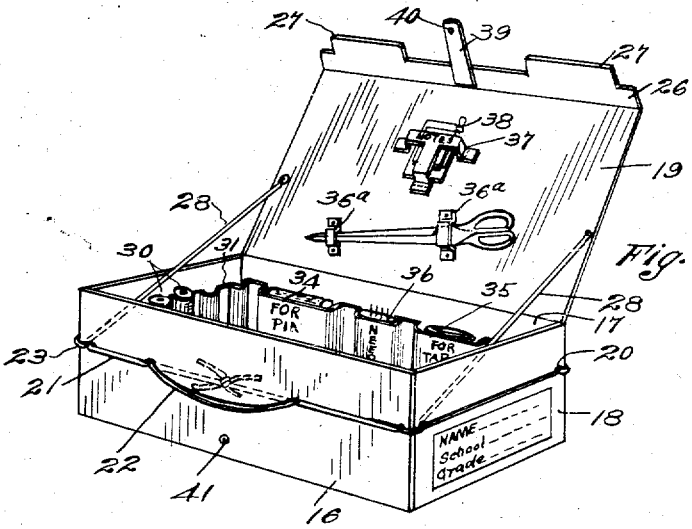
Figure 1 is a view showing in perspective one form of work receptacle embodying my invention, with the cover in open position.
Figure 2:
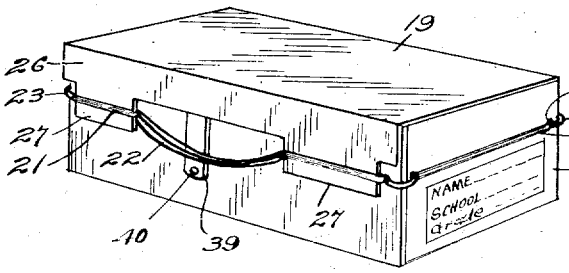
Figure 2 is a view similar to Fig. 1 with the cover in closed position.

As clearly shown in Fig. 1, the cover portion 19 is provided with a flap 26 recessed to provide extensions 27 which are adapted to engage between the lace 21 and the front side 16 at points between the handle 22 and the ends of the receptacle. By this arrangement it will be seen that the extensions 27 serve to securely maintain the cover 19 against any horizontal shifting when the cover is in closed position, thereby preventing undue wear at the rear or hinged edge of the cover and the possible tearing of the cover from the receptacle. In order to support the cover 19 in open position, supporting straps 28 are secured at one end to the cover and tied at their opposite ends to the lace 21 at points within the receptacle. The length of these straps is such that when the cover is in open position as shown in Fig. 1, it will be maintained in its substantially vertical position.

As clearly shown in Fig. 3, the end portion 18 is provided upon its inner side with a piece of flexible material 29 secured to the side portion to provide spool receiving pockets 30 and a thimble receiving pocket 31. Secured to the other end portion 18 is a piece of flexible material 32 arranged to provide a pocket adapted for the reception of miscellaneous sewing articles. The rear side portion 17 is secured to a length of flexible material 33 arranged to provide a pin receiving pocket 34, a tape measure receiving pocket 35, and a needle receiving pocket 36.

As clearly shown in Fig. 1, the inner side of the cover 19 is provided with a pair of straps or tape 36[a] adapted to receive a pair of scissors, and with a tape 37 constructed to retain a note book upon the cover. Another tape 38 is secured to the cover for holding a pencil adjacent the note book.

For securing the cover 19 in closed position, the flap 26 is provided medially of its ends with a tab 39 carrying the socket portion 40 of a snap fastener. The head portion 41 of the fastener is secured to the outer side of the front side portion 16 so that when the cover 19 is in closed position, the socket portion can engage the head portion to securely retain the cover in such closed position.

From the foregoing description taken in conjunction with the accompanying drawings, it will be manifest that I have provided a work receptacle which in its knock-down position as shown in Fig. 4, can be snugly packed with similarly constructed receptacles to facilitate storage or shipment, and that when set up position provides an extremely simple, efficient and durable receptacle for the carrying and storage of sewing paraphernalia. Such a reception is particularly adapted for use by school children in the study of sewing or other similar domestic science, and it provides a container which can be conveniently carried while at the same time maintaining the paraphernalia in definite positions within the receptacle.

It is of educational value inasmuch as it develops an interest in right arrangement of the keeping of sewing articles. Obviously, it eliminates promiscuous handling of the articles and the receptacle can be made to fit school lockers to permit of its being readily stored when not in use.

What is claimed is:

1. A work receptacle comprising a bottom, foldable end walls attached to the bottom, foldable front and back walls attached to the bottom, a top hinged on the back wall and having a front flap with spaced extensions, the outer ends of the extensions being inset from the corners of the flap; the walls all having perforations near their corner edges and the front wall having holes exposed between the closed flap extensions, and a fastening cord tied around the receptacle and rove through the apertures and holes to secure the parts and forming a handle between the extensions.

2. A sewing box having a bottom; front, end and back walls foldable up along the respective corners of the bottom, each of said walls having perforations near their ends, the front of the box having holes intermediate the end perforations therein and a lacing passing around all of the walls and having complete corner fastening bights or loops passing through the corner perforations to eliminate slipping; the lace passing in portions from the front corners along the outside of the front and then a multiplicity of times in and out of the intermediate holes and constituting intermediate complete loops having stretches inside and outside the center of the front wall to form a strong handle and substantially preventing load pull on said portions.

3. A sewing box having a bottom; front, end and back walls foldable up along the respective corners of the bottom, each of said walls having perforations near their ends, the front of the box having holes intermediate the end perforations therein, and a lacing passing around all of the walls and having complete corner fastening bights or loops passing through the corner perforations to eliminate slipping and being free of knots thereat, the lace passing in front portions along the outside of the front and then a multiplicity of times in and out of the intermediate holes and constituting complete loops having stretches inside and outside the center of the front wall to form a strong handle and relieving the said portions of load pull.

In testimony whereof I have set my hand.

LUTIE V. BURKHOLDER.